(12) United States Patent
Heine

(10) Patent No.: US 10,320,507 B2
(45) Date of Patent: Jun. 11, 2019

(54) METHOD FOR DETERMINING A PROPAGATION TIME OF A TELEGRAM IN A COMMUNICATION NETWORK, AND CORRESPONDING NETWORK COMPONENTS

(71) Applicant: SIEMENS AKTIENGESELLSCHAFT, Munich (DE)

(72) Inventor: Holger Heine, Aurich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/508,594

(22) PCT Filed: Sep. 10, 2014

(86) PCT No.: PCT/EP2014/069263
§ 371 (c)(1),
(2) Date: Mar. 3, 2017

(87) PCT Pub. No.: WO2016/037645
PCT Pub. Date: Mar. 17, 2016

(65) Prior Publication Data
US 2017/0279552 A1 Sep. 28, 2017

(51) Int. Cl.
*H04J 3/06* (2006.01)
*H04L 12/26* (2006.01)

(52) U.S. Cl.
CPC ........ *H04J 3/0667* (2013.01); *H04L 43/0852* (2013.01); *H04L 43/0864* (2013.01);
(Continued)

(58) Field of Classification Search
CPC . H04L 43/10; H04L 43/0864; H04L 43/0852; H04J 3/0667
See application file for complete search history.

(56) References Cited

U.S. PATENT DOCUMENTS

| | | | |
|---|---|---|---|
| 6,628,697 B1 * | 9/2003 | Douglas | H04J 3/0682 370/510 |
| 6,771,614 B1 * | 8/2004 | Jones, IV | H04B 7/2612 370/310 |

(Continued)

OTHER PUBLICATIONS

IEEE1588-2008 "IEEE Standard for a Precision Clock Synchronization Protocol for Networked Measurement and Control Systems", IEEE Instrumentation and Measurement Society, Jul. 24, 2008 (Revision of IEEE std 1588-2002).

*Primary Examiner* — Asad M Nawaz
*Assistant Examiner* — Syed Ali
(74) *Attorney, Agent, or Firm* — Laurence Greenberg; Werner Stemer; Ralph Locher

(57) ABSTRACT

A method determines a propagation time of a message in a communication network. The message is transmitted from a first network component to a second network component along a communication connection, and the first network component detects a transmission time of the message and stores the corresponding transmission time information. The propagation time is determined using the transmission time information. The aim is to improve the accuracy when determining the propagation time. This is achieved in that the second network component returns the message to the first network component immediately after the message is encountered in the second network component. The first network component detects a reception time upon receiving the returned message and stores corresponding reception time information of the message. The propagation time of the message along the communication connection is determined using the transmission time information of the message and the reception time information of the message.

7 Claims, 3 Drawing Sheets

(52) U.S. Cl.
CPC .......... *H04L 43/0876* (2013.01); *H04L 43/10* (2013.01); *H04L 43/106* (2013.01)

(56) References Cited

U.S. PATENT DOCUMENTS

| | | | |
|---|---|---|---|
| 8,289,858 B2 | 10/2012 | Brolin et al. | |
| 2004/0213387 A1* | 10/2004 | Chandrasekaran | G06F 16/2322 379/93.24 |
| 2008/0123682 A1* | 5/2008 | Yackoski | H04L 45/34 370/443 |
| 2008/0144668 A1* | 6/2008 | Hall | H04J 3/0652 370/503 |
| 2011/0141922 A1* | 6/2011 | Kotrla | H04L 43/0852 370/252 |
| 2012/0263165 A1* | 10/2012 | Zakrzewski | H04W 56/009 370/350 |

* cited by examiner

METHOD FOR DETERMINING A PROPAGATION TIME OF A TELEGRAM IN A COMMUNICATION NETWORK, AND CORRESPONDING NETWORK COMPONENTS

BACKGROUND OF THE INVENTION

Field of the Invention

The invention relates to a method for determining a propagation delay of a message in a communications network, in which method a first network component transmits a message to a second network component along a communications link, wherein the first network component registers a send time for the message and saves a corresponding item of send-time information for the message, and the send-time information is used to determine the propagation delay of the message along the communications link.

The invention also relates to correspondingly designed network components for operation in a communications network.

It is often required in communications networks to synchronize network components connected to the communications network to the same time as one another. For this purpose, the individual network components typically contain their own clocks, which must be synchronized with one another using special techniques. In this context, end devices in a communications network or devices that control and regulate the network traffic, e.g. switches, bridges, routers, are deemed to be examples of network components. End devices containing an integrated device for controlling and regulating the network traffic, e.g. an end device containing an integrated switch, are also referred to below as network components.

Precise time synchronization is particularly important in automation and control systems for technical facilities and processes comprising spatially distributed automation devices that are connected to one another via a communications network. In this case, requirements that depend on time synchronization consist, for example, in being able to acquire measured values synchronously in time using a plurality of automation devices, or being able to compare measured values from a plurality of automation devices with one another on the basis of timestamps. In addition, monitoring functions and open-loop and closed-loop control functions must often be performed exactly synchronized with one another in time. In such automation and control systems, the clocks of different automation devices must usually be synchronized with one another within the microsecond range. An example of an automation system is a substation automation system for controlling, monitoring and protecting electrical power grids and substations.

One way of synchronizing clocks of distributed network components consists in receiving in each network component a timing clock distributed by a radio transmitter, and adjusting the internal clock in each of the devices to match the timing clock. For instance, the time signal emitted by the satellite GPS system (GPS—Global Positioning System) can be used for this purpose. This solution is relatively expensive because it requires receivers in all the network components to be synchronized; moreover, adequate reception of the GPS time signal is not guaranteed everywhere.

Another option is to use the communications network itself for time synchronization. In this case, time synchronization messages are transmitted within the communications network and used for time synchronization.

One method for performing time synchronization using time synchronization messages is defined in the international standard IEEE 1588-2008, for example, and is called the Precision Time Protocol (PTP). According to the PTP standard, what is known as a "best master clock" algorithm is used to select one network component within a communications network to be the "grandmaster clock" (also referred to below as a "grandmaster"), the clock of which is the clock to which all the other network components (slave clocks or "ordinary clocks", also referred to below as "slaves") must be synchronized. For this purpose, the grandmaster sends time synchronization messages at a send time $tsync_1$ defined on the basis of its own clock. This time $tsync_1$ is either entered directly in the time synchronization message or transmitted to the slaves in a follow-up message. The particular slave receives the time synchronization message at the time $tsync_2$, and if the network delay is known for the time synchronization message between the send time $tsync_1$ at the grandmaster and the receive time $tsync_2$, can update its own clock accordingly.

The network delay between the grandmaster and the particular slave clock is determined in particular by the propagation delay of the time synchronization message along the communications links, e.g. wired communications lines, that exist between the grandmaster and the slave clock. If additional network components (e.g. switches designed to be "transparent clocks" as specified in IEEE 1588:2008) also lie in the transmission path of the time synchronization message, then the network delay is also determined by the residence time of the time synchronization message in these network components lying between the grandmaster and the slave clock. Whereas the residence time in the network components in question can be acquired using the respective local clocks, the propagation delay along the communications links must be determined by measurement. According to the standard IEEE 1588:2008, this is done by using what is known as the "Pdelay method" between each pair of adjacent network components. In this method, a first network component i, e.g. the slave clock, sends at time $t_1$ a message ("Pdelay_Req") to an adjacent, second network component j, e.g. a switch. This adjacent network component j receives the message and saves the arrival time $t_2$ of this message. Then the adjacent network component j itself sends a further message ("Pdelay_Resp") to the first network component i and registers the send time $t_3$ of this message. This send time $t_3$ and the receive time $t_2$ are transmitted to the first network component i in the message itself or in a follow-up message. The first network component i receives this message and saves the receive time $t_4$ of this message. The times $t_1$ to $t_4$ are now available at the first network component i. The propagation delay $T_{i\_j}$ of a message between the network component i and the network component j can be calculated from these times using the equation:

$$T_{i\_j} = \frac{(t_2 - t_1) + (t_4 - t_3)}{2}$$

To ensure as precise time synchronization as possible, the propagation delay between two network components must be determined as accurately as possible. Timestamping is used in the respective network components to determine the relevant send and receive times. For the purpose of timestamping, each network component provides a timestamp clock, which is derived from the internal clock of the device in question and is used for timestamping the send and receive times. The faster said timestamp clock is set, the more precisely specific events can be timestamped.

Even for timestamp clocks that run relatively fast, however, there is the possibility that an event occurs between two clock pulses of the timestamp clock, with the result that such an event may be timestamped less precisely and hence may result in inaccuracies, for instance when the above-mentioned algorithm is used for determining Pdelay.

Especially in complex communications networks containing numerous network components arranged in series (e.g. in ring-topology communications networks, which are used relatively frequently for automation systems for redundancy reasons), these inaccuracies established in each case between adjacent network components can quickly accumulate into values that make exact time synchronization of the individual network components in the network more difficult because of the effect of these values on adjusting the individual clocks to the grandmaster clock.

SUMMARY OF THE INVENTION

Proceeding from a method of the type mentioned in the introduction, the object of the invention is thus to increase the precision in determining the propagation delay.

This object is achieved by a method of the type mentioned in the introduction, in which the second network component returns the message to the first network component immediately after it arrives at the second network component, the first network component, on receiving the returned message, registers a receive time for the message and saves a corresponding item of receive-time information for the message, and the send-time information for the message and the receive-time information for the message are used to determine the propagation delay of the message along the communications link.

The invention is based on the finding that the inaccuracies in determining the propagation delay can largely be ascribed to the timestamping of the send times and/or receive times. In particular, timestamping a receive time can actually be associated with relatively large inaccuracies. The invention makes use of this finding and hence reduces the number of timestamps needed for determining the propagation delay from four timestamps, which need to be given according to the known Pdelay method, to just two timestamps. To achieve this, the second network component returns the received message back to the first network component immediately, i.e. without any time delay, and therefore the second network component no longer has to perform any timestamping at all. Since now it is only the first network component that has to perform the timestamping, any time differences or path differences between the local clocks of the two network components are irrelevant. In particular in the method according to the invention, one of the two timestamps for the receive time that are needed according to the known method is omitted, specifically that timestamp defining the time that the message sent by the first network component is received at the second network component. A significant increase in the precision in determining the propagation delay of the message can hence be achieved overall.

The determined propagation delay can be used for the communications link in question as a parameter for the time synchronization using time synchronization messages. Should a plurality of communications links lie between a grandmaster clock and a slave clock, then the propagation delays of said links must be determined accordingly and summed for the total path. In addition, the residence times of the time synchronization messages in the respective network components must be taken into account, although these times can be determined by the network components themselves. In the case of a "transparent clock", as defined in the standard IEEE 1588:2008, the network component in question enters the residence time of the message in each case directly into the time synchronization message.

Another advantage of the method according to the invention is that it can be implemented easily in a circuit chip using hardware coding (e.g. FPGA, ASIC) and does not require any modification to the operating software of a network component.

The method according to the invention should be performed before or when a communications network is put into operation in order to have available all the parameters needed to perform the time synchronization during operation of the communications network. It is also recommended to perform the method repeatedly at regular or irregular intervals and/or on an event-driven basis (e.g. in the event of a change in the network topology) and/or at the request of an operator of the communications network (e.g. after a communications link is replaced), in order to verify and, if applicable, adjust the current values of the propagation delays.

Specifically, according to an advantageous development of the method according to the invention, if symmetrical network delays are assumed for the message in the forward and return directions along the communications link between the two network components, the propagation delay of the message along the communications link can be determined using the equation:

$$T_{i\_j} = \frac{t_{i2} - t_{i1}}{2}$$

where the individual expressions have the following meanings:

$T_{i\_j}$: propagation delay of the message along the communications link between network component i and network component j;

$t_{i1}$: send-time information defining the time the message is sent from network component i;

$t_{i2}$: receive-time information defining the time the message is received at network component i;

The aforesaid assumption of symmetrical network delays is normally satisfied to a sufficient degree of accuracy in automation systems.

According to another advantageous embodiment of the method according to the invention, it can also be provided that the second network component receives the message and returns said message immediately after receipt to the first network component, solely at a physical, bit-transmission level.

This can advantageously achieve that the message is returned to the first network component virtually without a residence period in the second network component, because the second network component performs no local processing steps at all on the message, and the forwarding is performed purely at the physical circuit level (hardware) without the need to execute program-controlled processing operations (software) for this purpose. The communications mode described is also referred to as a "loop mode". The lowest transmission layer in the OSI model (Open Systems Interconnection model) is considered to be the physical, bit-transmission level in this case.

According to another advantageous embodiment, it can also be provided that the first network component synchronizes the time of sending the message with a timestamp clock used for internal timestamping.

This can further increase the accuracy of determining the propagation delay, because synchronizing the send time of the message with the timestamp clock allows the message to be sent exactly at the time of arrival of a timestamp pulse. Hence only the receive time, which, being unpredictable, cannot be synchronized with a timestamp clock, still constitutes a potential uncertainty in determining the propagation delay. These uncertainties can be kept within limits, however, for a timestamp clock that is chosen to be sufficiently fast.

Another advantageous embodiment of the method according to the invention provides that the message contains a test-data sequence.

The message can thereby be approximated in terms of its structure to average messages to be transmitted in the communications network, in particular to the time synchronization messages needed for time synchronization. It is also possible thereby to distinguish the message easily from any other messages, ensuring that the correct message is actually used for determining the propagation delay.

According to another advantageous embodiment, it is additionally provided that the second network component also determines a propagation delay of a further message between the second network component and the first network component by the second network component transmitting the further message to the first network component along the communications link, wherein the second network component registers a send time for the further message and saves a corresponding item of send-time information for the further message, the first network component returns the further message to the second network component immediately after it arrives at the first network component, the second network component, on receiving the returned further message, registers a receive time for the further message and saves a corresponding item of receive-time information for the further message, and the send-time information for the further message and the receive-time information for the further message are used to determine the propagation delay of the further message along the communications link.

According to this embodiment, the propagation delay can be determined redundantly, specifically because it is determined in a corresponding manner in one case by the first network component and in one case by the second network component.

In this context, verifying whether the determined propagation delay is correct can be performed particularly easily by comparing the propagation delay of the message determined by the first network component with the propagation delay of the further message determined by the second network component, and if there is a difference that exceeds a preset threshold value, the determined propagation delays are discarded.

This ensures that only plausible values for propagation delays are used for the further time synchronization. The reason for this is that since it can be assumed that the determinations of the propagation delay produce results sufficiently close in value irrespective of the send direction of the message or of the further message, then significant differences in the determined propagation delays indicate a measurement error and therefore the determined propagation delays must be discarded. The measurement can subsequently be repeated. If determining the propagation delay fails one or more times, it is also possible to issue an error message to the operator of the communications network in order to initiate, if applicable, maintenance or checking of the network components and/or of the communications link. Correspondingly, if there is a sufficiently exact match, either one of the two determined values of the propagation delays or a mean value thereof can be saved as the final value for the propagation delay along the communications link and used for time synchronization.

The aforementioned object is also achieved by at least two network components for operation in a communications network containing a plurality of network components to be synchronized with one another in time, wherein the network components are designed, for the purpose of determining a propagation delay of a message along a communications link between a first network component and a second network component, to send a message from the first network component to the second network component along the communications link, and to register a send time of the message and save a corresponding item of send-time information for the message, and to use the send-time information to determine the propagation delay of the message along the communications link.

According to the invention, the second network component is designed to return the message to the first network component immediately after it arrives at the second network component, the first network component is designed to register, on receiving the returned message, a receive time for the message and to save a corresponding item of receive-time information for the message, and the first network component is designed to use the send-time information for the message and the receive-time information for the message to determine the propagation delay of the message along the communications link.

All the embodiments presented above and below with regard to the method according to the invention apply to the network components according to the invention, and vice versa accordingly; in particular, the network components according to the invention are designed to implement the method according to the invention in any embodiment or a combination of any embodiments. In addition, with regard to the advantages of the network components according to the invention, reference is made to the advantages described for the method according to the invention.

The invention is explained in more detail below with reference to an exemplary embodiment. The specific design of the exemplary embodiment shall have no limiting effect whatsoever on the general design of the method according to the invention, of the network component according to the invention and of the communications network according to the invention; in fact individual design features of the exemplary embodiment can be freely combined in any way with one another and with the features described above.

DESCRIPTION OF THE INVENTION

Figure 1:
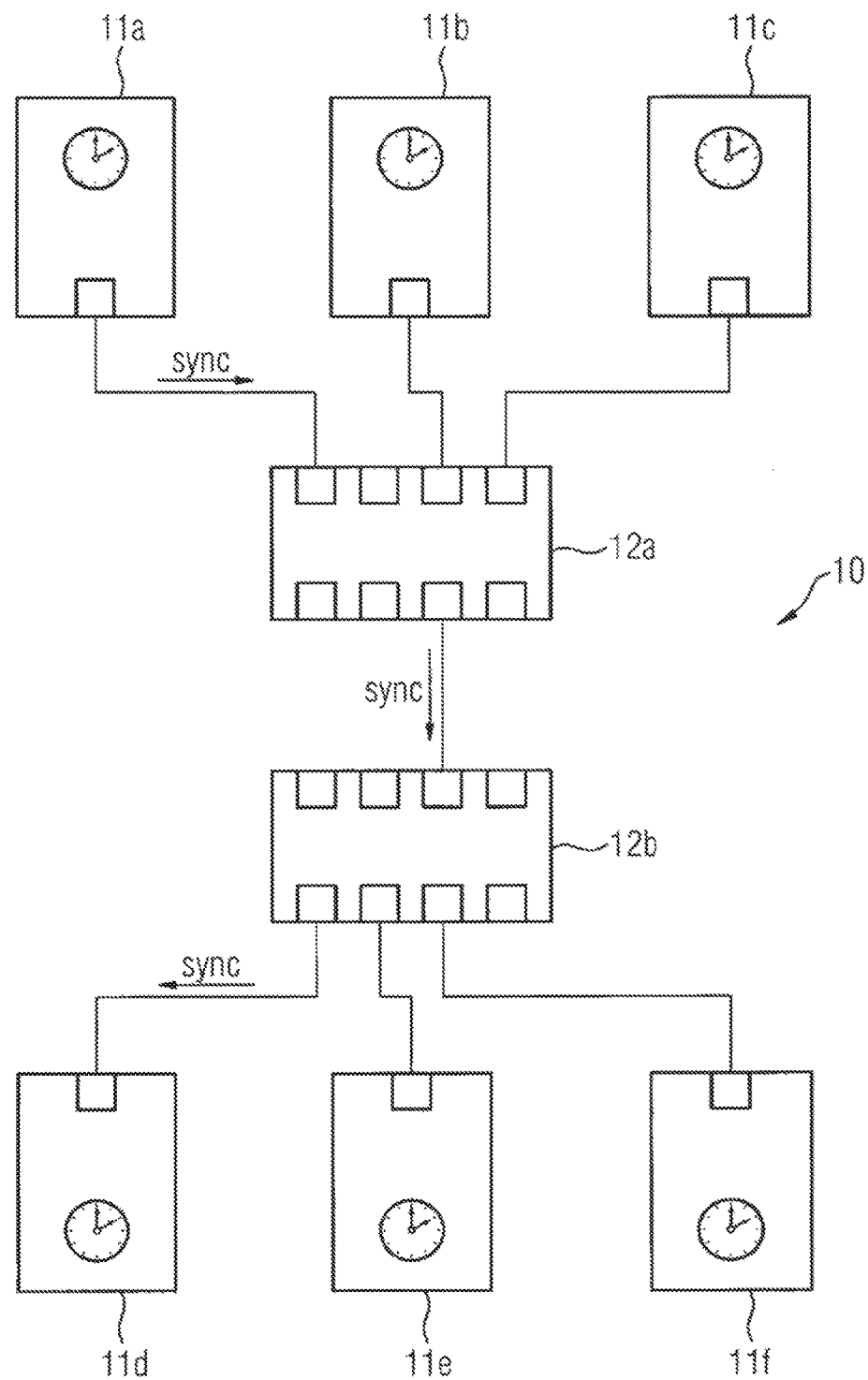
FIG. 1 shows a first exemplary embodiment of a communications network containing a plurality of network components.

FIG. 1 shows in a schematic view a communications network 10, to which are connected network components 11a-f. The network components 11a-f may be, in particular, automation devices of an automation system, e.g. for automating an electrical power grid. Said devices may be, for example, protection devices, meters, phasor meters, power meters, power quality devices, control stations and control devices, switch controllers etc. of an electrical substation automation system. Such automation devices can also be referred to in general as field devices or as IEDs ("intelligent electronic devices").

The communications network 10 additionally comprises network components 12a-b, for example components such as switches, bridges or routers having a plurality of ports. In the example explained below, the network components 12a-b constitute "transparent clocks" in the sense of standard IEEE 1588-2008.

The network components 11a-f are connected to one another via the network components 12a-b by means of communications links, so that each network component can exchange messages with every other network component. In addition, all the network components comprise local clocks, which must be synchronized with one another in terms of their respective local times. It shall be assumed by way of example that the local clock of the network component 11a constitutes a grandmaster clock, the time of which is the time to which the local clocks of all the other network components 11b-f must be synchronized.

In the communications network 10 are exchanged messages, which may contain, for example, measured values, control commands, status messages, recorded measurement curves or software updates. In order to be able to perform time synchronization as well, time synchronization messages are additionally also exchanged in the communications network 10. This shall be described in greater detail later.

Figure 2:
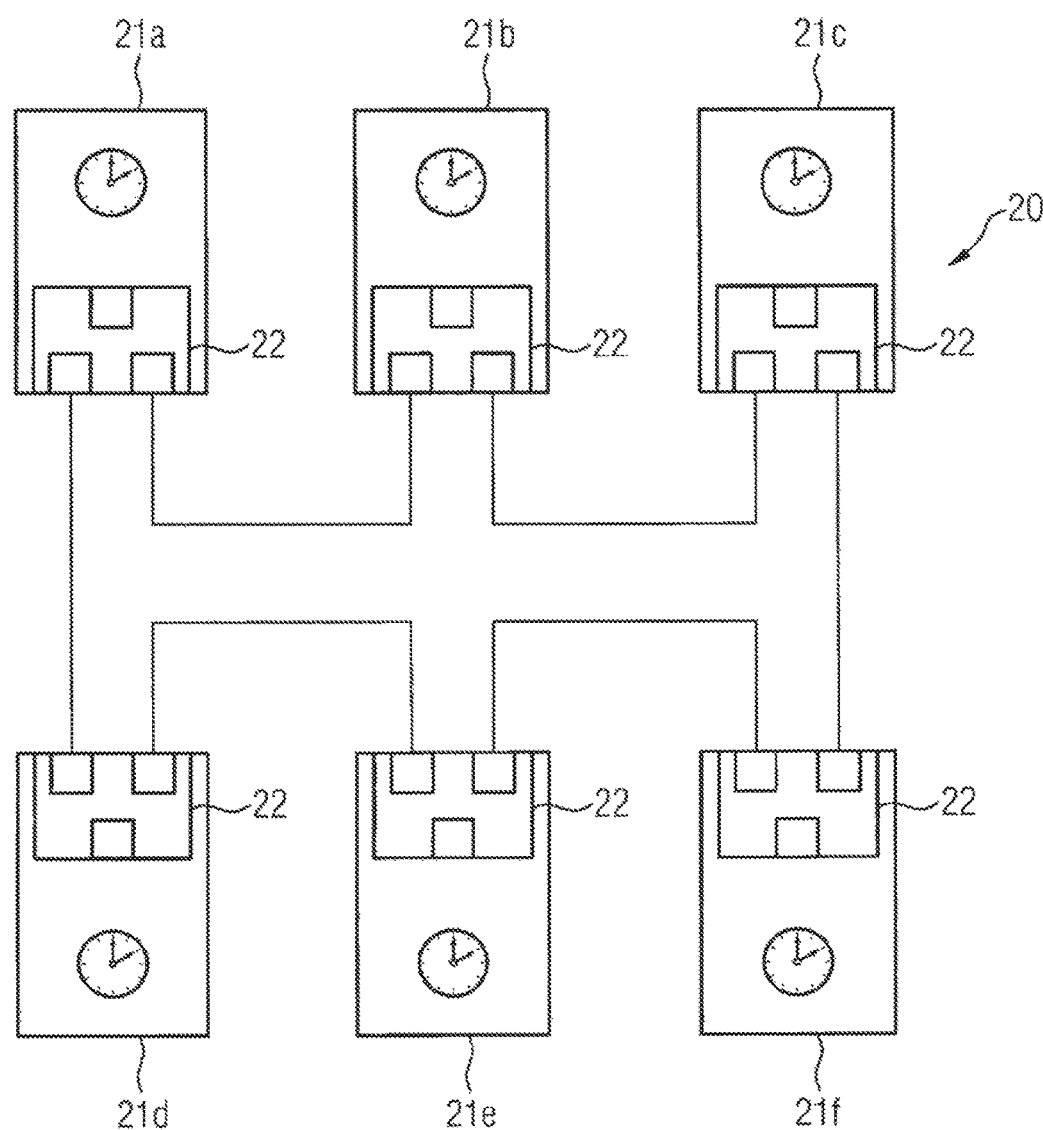
FIG. 2 shows a second exemplary embodiment of a communications network containing a plurality of network components.

FIG. 2 shows another exemplary embodiment of a communications network 20, in which embodiment, unlike the communications network 10 of FIG. 1, the communications network 20 has a ring topology. FIG. 2 shows in a schematic view a communications network 20, to which a plurality of network components 21a-f are connected.

The network components 21a-f comprise integrated switches 22, which switches may be 3-port switches, for example. The network components 21a-f containing the integrated switches also constitute "transparent clocks" in the sense of standard IEEE 1588-2008. In addition, each network component 21a-f comprises a local clock.

In the communications network 20, time synchronization messages are exchanged for the purpose of synchronizing the local clocks. It shall be assumed by way of example that the local clock of the network component 21a constitutes a grandmaster clock, the time of which is the time to which the local clocks of all the other network components 21b-f must be synchronized. In addition, other messages are also exchanged, as already explained above for FIG. 1.

Referring to FIG. 1, a method shall be explained below by way of example for time synchronization on the basis of time synchronization messages transmitted in the communications network 10. The method described below can also be applied correspondingly to the communications network 20 or to other communications networks in which time synchronization is performed.

It shall be explained below by way of example how the local clock of the network component 11d is synchronized with the local (grandmaster) clock of the network component 11a.

The network component 11a sends at regular intervals a time synchronization message "Sync" as a broadcast message to the other network components 11b-f, including also to the network component 11d. The send time $tsync_1$ of the time synchronization message is inserted in the time synchronization message as information. As an alternative to inserting the send time directly, this time can also be transmitted using a subsequent follow-up message.

The time synchronization message is transmitted by the network component 11a first to the network component 12a (switch). This component forwards the time synchronization message to the network component 12b (switch), which in turn forwards the time synchronization message to the network component 11d. On receiving the time synchronization message, the network component determines a receive time $tsync_2$. For synchronized times of the local clocks of the network component 11d and of the network component 11a, the receive time $tsync_2$ is given by:

$$tsync_2 = tsync_1 + T(Sync),$$

where T(Sync) is the network delay of the time synchronization message between the network component 11a and the network component 11d. If the network delay T(Sync) and the send time $tsync_1$ of the time synchronization message are known, the time of the local clock of the network component 11d can hence be checked and, if there are differences between the receive time $tsync_2$ determined on the basis of the local time and the reference time obtained from $tsync_1+T(Sync)$, updated.

The network delay T(Sync) is made up of two components. One comprises the sum of the propagation delays of the time synchronization message "Sync" along the individual communications links lying between the second network component and the first network component. Specifically, this total propagation delay is thus composed of the individual propagation delays of the time synchronization message along the communications link between the network component 11a and the network component 12a, along the communications link between the network component 12a and the network component 12b, and along the communications link between the network component 12b and the network component 11d.

The second component that is also included in the network delay T(Sync) of the time synchronization message in the example shown here, is the residence time of the time synchronization message in the respective network components lying between the second network component and the first network component. Said residence time can arise, for instance, as a result of the network component in question sending other messages before sending the time synchronization messages. Specifically, the total residence time is thus composed of the individual residence times of the time synchronization message in the network component 12a and in the network component 12b. In this example, the network components 12a and 12b constitute transparent clocks as specified in IEEE 1588:2008.

If there are no further network components arranged between the network component containing the grandmaster clock and the network component containing the slave clock, this second component of the network delay is obviously omitted. Instead of using "transparent clocks"

according to IEEE 1588:2008, which in effect "send through" the time synchronization messages and for this purpose measure their own residence time for the time synchronization message, it is also possible to use what are known as "boundary clocks" as specified in IEEE 1588: 2008, which assume a slave role to the grandmaster, and adopt a master role to the immediately following network component to be synchronized, and themselves send out time synchronization messages. Again in this case there are typically no further network components that lie between two network components to be synchronized and that could cause a corresponding residence time for the time synchronization message, with the result that the second component of the network delay would also be omitted in this case.

Whereas the residence time, if it exists, is determined by the network component concerned by measuring the time between the receipt and the forwarding of the time synchronization message, and usually is inserted as information in the time synchronization message or is sent as a follow-up message, the propagation delays must be determined individually along each of the communications links.

Figure 3:
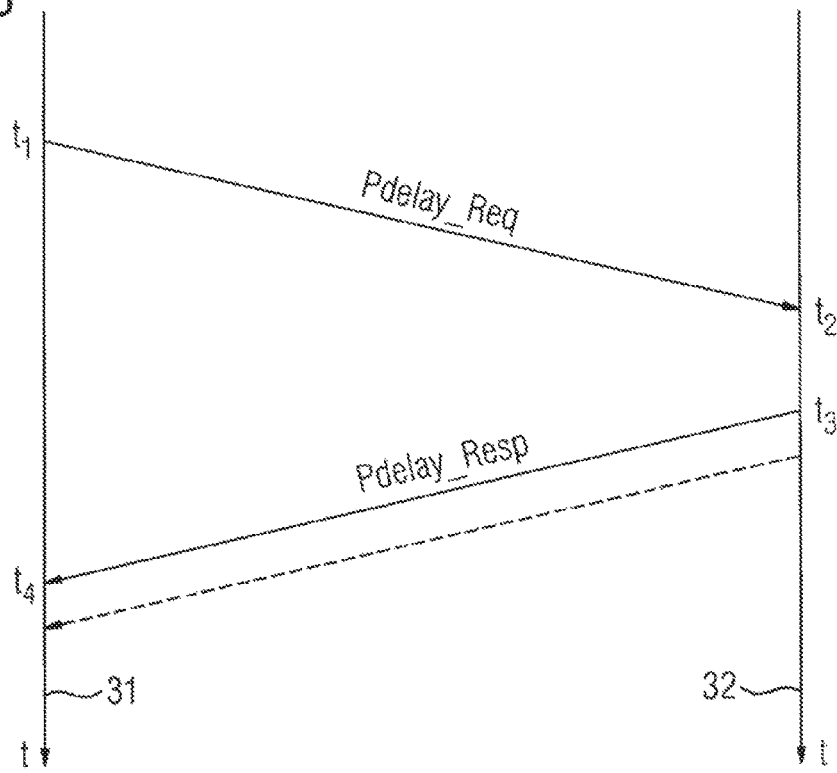
FIG. 3 shows a flow diagram for the purpose of explaining the known Pdelay method according to IEEE 1588:2008 for determining a propagation delay of a message.

It shall now be explained first with reference to FIG. 3, how the propagation delay between two network components is determined on the basis of the known "Pdelay method". A method for determining the propagation delay with increased precision is described below with reference to FIG. 4. Determining the propagation delay of a message between the network component 11$d$ (also referred to below as the "first network component") and the network component 12$b$ (also referred to below as the "second network component") shall be explained by way of example both for the method shown in FIG. 3 and for the method shown in FIG. 4. In order to determine the total propagation delay of a message between the network component 11$a$ and the network component 11$d$, the determination in question must be performed in a corresponding manner for all sub-paths separately between each pair of adjacent network components.

A flow diagram is shown in FIG. 3 for this method, in which the transmission of the messages needed for determining the propagation delay is plotted along timelines 31 and 32. In this case, the timeline 31 represents the events at the first network component 11$d$, and the timeline 32 represents the events at the second network component 12$b$.

In order to determine the propagation delay of a message between the first network component 11$d$ and the second network component 12$b$ on the basis of the known Pdelay method, the first network component 11$d$ sends at a time $t_1$ a message "Pdelay_Req" to the second network component 12$b$. The time $t_1$ is registered by timestamping based on the local clock of the first network component 11$d$.

The second network component 12$b$ receives the message "Pdelay_Req", registers the associated receive time $t_2$ by timestamping based on its local clock, and saves this receive time $t_2$. At time $t_3$, the second network component 12$b$ sends as a response to the message "Pdelay_Req" a further message "Pdelay_Resp" to the first network component 11$d$. In the process, it registers the send time $t_3$ by timestamping based on its local clock, and transmits the times $t_2$ and $t_3$ to the first network component 11$d$. This transmission can be made using the message "Pdelay_Resp" or be performed using a follow-up message, as indicated schematically in FIG. 3 by a dashed line. In addition, the times $t_2$ and $t_3$ can also be transmitted as one value (e.g. $t_3-t_2$).

The first network component 11$d$ receives the message "Pdelay_Resp" and registers the receive time $t_4$ by timestamping based on its local clock. The first network component hence has available the information on the times $t_1$ to $t_4$, and can determine the propagation delay of a message along the communications link between the first network component 11$d$ (index i) and the second network component 12$b$ (index j) using the equation given in the introduction:

$$T_{i\_j} = \frac{(t_2 - t_1) + (t_4 - t_3)}{2}$$

The disadvantage here is that a total of four timestamps are needed to determine the propagation delay, each of which can be inexact. In particular, those timestamps given on receipt of a message can contribute significantly to the inaccuracies, because for these timestamps there is no facility for synchronizing the event (the receipt of the message) with the timestamp clock.

Figure 4:
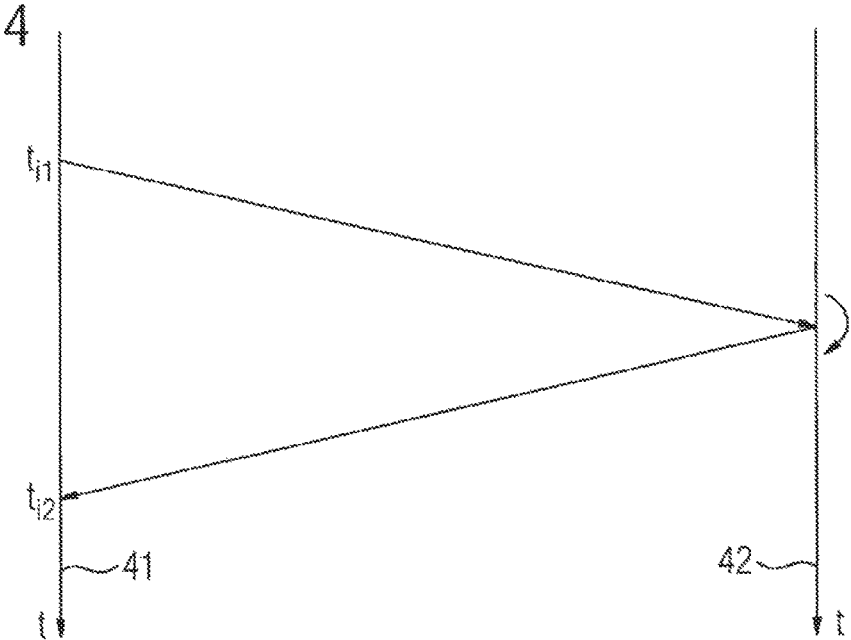
FIG. 4 shows a flow diagram for the purpose of explaining the method for determining with increased precision a propagation delay of a message.

Thus FIG. 4 shows a method for determining the propagation delay of a message with increased precision. FIG. 4 also shows a flow diagram for this method, in which the transmission of the messages needed to determine the propagation delay is plotted along timelines 41 and 42. In this case, the timeline 41 represents the events at the first network component 11$d$, and the timeline 42 represents the events at the second network component 12$b$.

At time $t_{i1}$, the first network component 11$d$ (index i) sends a message to the second network component 12$b$ (index j). In the process, the first network component 11$d$ registers time $t_{i1}$ by timestamping based on the local clock, and saves said time as send-time information.

The second network component 12$b$ returns this message back to the first network component 11$d$ immediately after receipt, without any timestamping at all and without performing any other processing operations on the message.

For this purpose, the second network component 12$b$ can be placed temporarily into a loop mode, for example, in which it receives messages and immediately returns again said messages solely at a physical, bit-transmission level corresponding to the lowest layer in the OSI model.

The second network component 12$b$ can identify that the received message is a message to be returned immediately, for instance from a prefix placed at the front of the message. Alternatively, the second network component 12$b$ could be informed by the first network component 11$d$ about the sending of the message in question using an advance message. This advance message can be sent, for example, at a fixed time interval before the message in question is sent, so that the second network component can obtain from the receipt of the advance message the expected time of arrival of the message in question. As another alternative, the message in question can also be sent at regular time intervals so that the second network component 12$b$ can accordingly be prepared for the arrival of the message in question and can temporarily activate the loop mode.

The first network component 11$d$ receives the returned message and registers the receive time $t_{i2}$ by timestamping. This time is saved as receive time information. From the times $t_{i1}$ and $t_{i2}$ that are now available, the first network component 11$d$ can use the following equation to determine the propagation delay $T_{i\_j}$ being sought:

$$T_{i\_j} = \frac{t_{i2} - t_{i1}}{2}$$

The value of the propagation delay determined on the basis of the last described method is more precise because only two timestamps are needed instead of four to determine this value. In addition, the two timestamps are acquired using the same local clock, namely the local clock of the first network component 11d, with the result that differences, e.g. drift or path inaccuracies, between the two local clocks also have no effect.

In order to increase further the precision of the last described method, the sending of the message should be synchronized with the internal timestamp clock of the first network component 11d. In other words, the send time should be set exactly at a clock pulse of the timestamp clock so that the send-time information can be defined very precisely, and the only inaccuracy that can still arise is as a result of the timestamping on receipt of the message at the first network component 11d.

Should the residence time of the message in the second network component 12b not be negligible, despite the immediate return, it can be measured in advance and included in the determination of the propagation delay.

The message used for determining the propagation delay can contain a specific, defined test-data sequence, for example. Not only does this allow the message in question to be identified easily and distinguished from other messages, but also the structure of this message can thereby be approximated to the structure of a typical time synchronization message in order to produce as closely as possible the same communications load for the measurement.

In addition, the method explained in detail with reference to FIG. 4 can also be applied in a corresponding manner in the opposite direction. In this case, the second network component 12b would send a further message, and the first network component 11d would return the received further message immediately. The propagation delay is then determined in a corresponding manner in the second network component 12b.

The values for the propagation delays determined in the two network components can then be compared with one another. Only when there is a sufficiently good match between both values should the determined propagation delay be used as a parameter for the time synchronization. If, however, there are significant differences between the two values, then the determined values should be discarded, and a repeat determination should be performed. In addition, an error message can be issued that informs the operator of the communications network about the error in the determination of the propagation delay.

Although the method for determining the propagation delay has been explained above by way of example only for the two network components 11d and 12b, the propagation delays between each of the other adjacent network components can be determined in a corresponding manner.

The invention claimed is:

1. A method for synchronizing local clocks in a communications network, the communications network having several network components and each of the network components having a local clock and the local clock of one of the network components is a grandmaster clock to which the local clocks of remaining ones of the network components being synchronized, which comprises the steps of:

transmitting, via a first network component, a message to a second network component along a communications link, wherein the first network component registers a send time for the message and saves a corresponding item of send-time information for the message;

using the send-time information to determine a propagation delay of the message along the communications link;

returning, via the second network component, the message to the first network component immediately after the message arrives at the second network component, wherein the second network component receives the message and returns the message immediately after receipt to the first network component, solely at a physical, bit-transmission level;

registering a receive time for the message and saving a corresponding item of receive-time information for the message upon receiving a returned message in the first network component;

using the send-time information for the message and the receive-time information for the message to determine the propagation delay of the message along the communications link, the propagation delay of the message along the communications link being determined by using the equation:

$$T_{i\_j} = \frac{t_{i2} - t_{i1}}{2}$$

where
$T_{i\_j}$ is the propagation delay of the message along the communications link between the first network component i and the second network component j;
$t_{i1}$ is the send-time information defining a time the message is sent from the first network component i; and
$t_{i2}$ is the receive-time information defining a time the message is received at the first network component i; and
using the propagation delay to synchronize the local clocks of the network components to the grandmaster clock.

2. The method according to claim 1, which further comprises providing the message with a test-data sequence.

3. The method according to claim 1, wherein:
the second network component determines a propagation delay of a further message between the second network component and the first network component by the second network component transmitting the further message to the first network component along the communications link, wherein the second network component registers a send time for the further message and saves a corresponding item of send-time information for the further message;
the first network component returns the further message to the second network component immediately after the further message arrives at the first network component;
the second network component, on receiving a returned further message, registers a receive time for the further message and saves a corresponding item of receive-time information for the further message; and
the send-time information for the further message and the receive-time information for the further message are used to determine the propagation delay of the further message along the communications link.

4. The method according to claim 3, wherein:
the propagation delay of the message determined by the first network component is compared with the propagation delay of the further message determined by the second network component; and if there is a difference that exceeds a preset threshold value, the propagation delays are discarded.

5. The method according to claim 1, wherein the first network component synchronizes a time of sending the message with a timestamp clock used for internal time stamping.

6. Network components for operation in a communications network, the network components comprising:
a first network component having a local clock;
a second network component having a local clock;
a plurality of further network components to be synchronized with one another in time;
a communications link;
said first and second network components for a purpose of determining a propagation delay of a message along said communications link between said first network component and said second network component are configured to:
send the message from said first network component to said second network component along said communications link, and to register a send time of the message and save a corresponding item of send-time information for the message; and
use the send-time information to determine the propagation delay of the message along said communications link;
said second network component is configured to return the message to said first network component immediately after the message arrives at said second network component, wherein said second network component receives the message and returns the message immediately after receipt to said first network component, solely at a physical, bit-transmission level;
said first network component is configured to register, on receiving a returned message, a receive time for the message and to save a corresponding item of receive-time information for the message;
said first network component is configured to use the send-time information for the message and the receive-time information for the message to determine the propagation delay of the message along said communications link, the propagation delay of the message along the communications link being determined by using the equation:

$$T_{i\_j} = \frac{t_{i2} - t_{i1}}{2}$$

Where $T_{i\_j}$ is the propagation delay of the message along the communications link between said first network component i and said second network component j; $t_{i1}$ is the send-time information defining a time the message is sent from said first network component i; and $t_{i2}$ is the receive-time information defining a time the message is received at said first network component i; and said network components are configured to use the propagation delay to synchronize a respective said local clock.

7. A method for synchronizing local clocks in a communications network, the communications network having several network components and each of the network components having a local clock and the local clock of one of the network components being a grandmaster clock to which the local clock of each of remaining ones of the network components being synchronized, the method comprises the steps of:
transmitting, via a first network component, a message to a second network component along a communications link, wherein the first network component registers a send time for the message and saves a corresponding item of send-time information for the message, wherein the first network component synchronizing a time of sending the message with a timestamp clock used for internal time stamping, in order to send the message exactly at the time of arrival of a timestamp pulse of the timestamp clock;
using the send-time information to determine a propagation delay of the message along the communications link;
returning, via the second network component, the message to the first network component immediately after the message arrives at the second network component, wherein the second network component receives the message and returns the message immediately after receipt to the first network component, solely at a physical, bit-transmission level;
registering a receive time for the message and saving a corresponding item of receive-time information for the message upon receiving a returned message in the first network component;
using the send-time information for the message and the receive-time information for the message to determine the propagation delay of the message along the communications link, the propagation delay of the message along the communications link being determined by using the equation:

$$T_{i\_j} = \frac{t_{i2} - t_{i1}}{2}$$

Where $T_{i\_j}$ is the propagation delay of the message along the communications link between the first network component i and the second network component j;
$t_{i1}$ is the send-time information defining a time the message is sent from the first network component i; and
$t_{i2}$ is the receive-time information defining a time the message is received at the first network component i; and
using the propagation delay to synchronize the local clocks of the network components to the grandmaster clock.

* * * * *